UNITED STATES PATENT OFFICE.

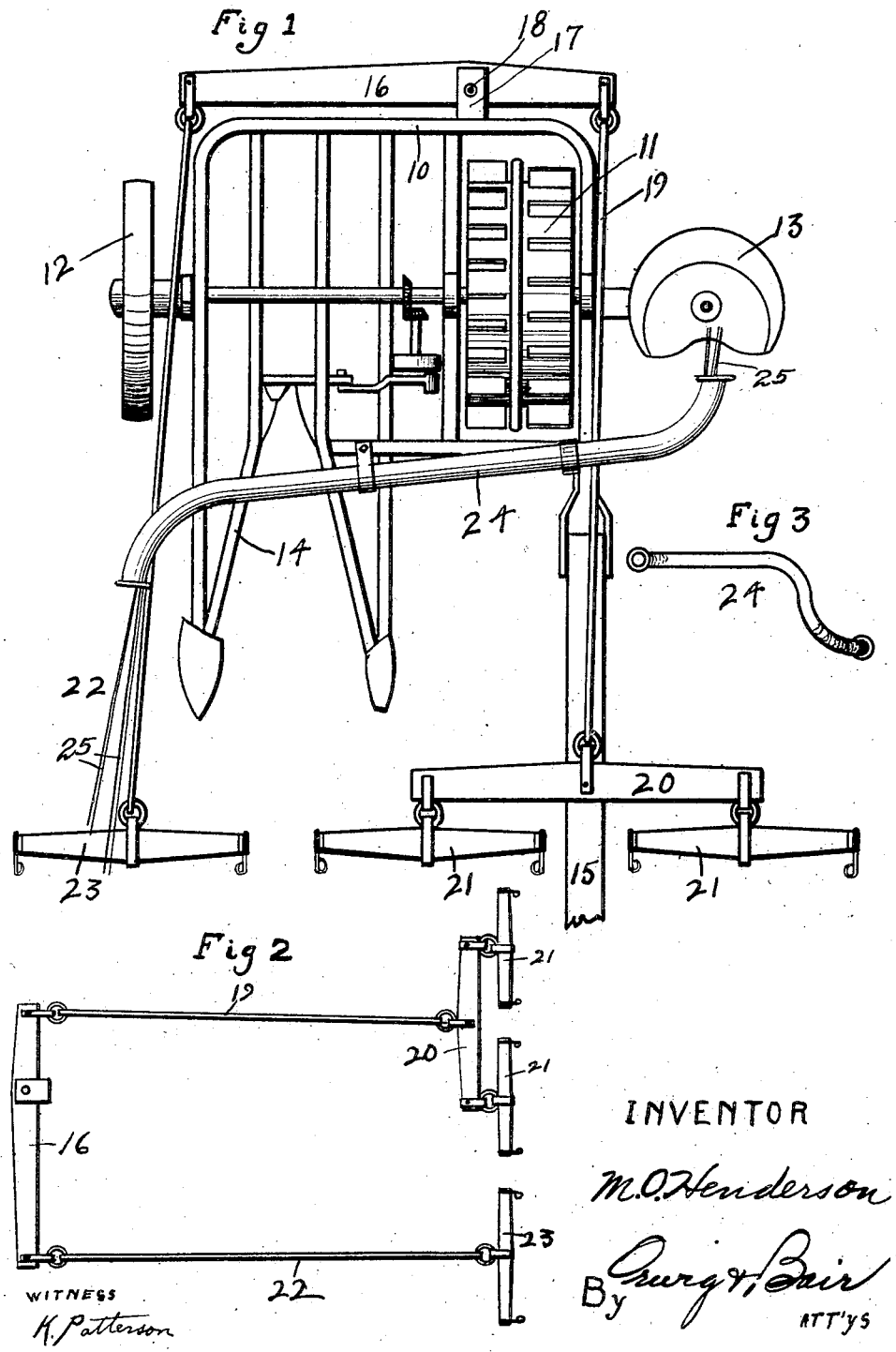

MORRIS O. HENDERSON, OF STORY CITY, IOWA.

HITCH FOR HARVESTING MACHINERY.

1,375,963. Specification of Letters Patent. Patented Apr. 26, 1921.

Application filed January 2, 1920. Serial No. 349,040.

*To all whom it may concern:*

Be it known that I, MORRIS O. HENDERSON, a citizen of the United States, and a resident of Story City, in the county of Hamilton and State of Iowa, have invented a certain new and useful Hitch for Harvesting Machinery, of which the following is a specification.

The object of my invention is to provide in connection with a corn harvester or similar machine, a hitch so constructed and arranged that little or no side draft will be imposed on animals pulling the machine, which hitch is so constructed, located and arranged that it and the draft animals will not interfere with the standing grain or fallen bundles or be interfered with thereby.

A further object is to provide in connection with such a hitch, means for making it possible to readily and easily control a draft animal, which may be traveling between rows of standing corn.

With these and other object in view, my invention consists in the construction, arrangement, and combination of the various parts of the device, whereby the objects contemplated are attained, as hereinafter more fully set forth, pointed out in my claims, and illustrated in the accompanying drawings, in which:

Figure 1 is a top or plan view of a device embodying my invention.

Fig. 2 is a similar view of the draft device, separated from the machine; and

Fig. 3 is a plan view of the line or tube.

It is well-known that in the use of corn harvesting machines, which are horse drawn, considerable dissatisfaction and inconvenience is experienced, due to the fact that it is necessary under the ordinary and common practice to so hitch all of the horses that they may travel down the rows of corn that have been cut.

The ordinary machines commonly in use require at least three horses. This usually means that one horse is not properly located with relation to the center of draft, and there is considerable side draft imposed on all three of the horses.

In the accompanying drawings for the purpose of illustrating the purpose of my invention, I have shown in Fig. 1 a sort of diagrammatic view of a corn harvester. It will be understood that I have not attempted to illustrate the harvester in detail, but I have shown the main frame 10, the large traction wheel 11, the supporting wheel 12, the seat 13, the gathering arms 14 and the tongue 15.

Ordinarily in common use, one team is hitched on the tongue and the third horse is hitched to the right of the tongue as shown in Figure 1, which would be the left of the tongue from the position of the driver, with the result that the draft animals are located considerably to one side of the load.

If three horses are driven abreast, the arrangement just mentioned is necessary, because the third horse with the ordinary mechanisms and attachments can not be driven between two rows of uncut corn, as the evener bar would interfere with the uncut rows, and it has not heretofore been known how to arrange the lines for driving such a horse in any satisfactory way. With the old hitch arrangement, the third horse tramps on the fallen bundles, damaging them and finding a hard path for good pulling.

My invention contemplates the use of a main unit bar, a doubletree and swingletree where three horses are used. It will be seen, after I have further explained my invention, that it will be very easy to modify the arrangement of the parts, and yet use the real invention involved for driving different numbers of horses.

In the form of my invention, which I have selected to illustrate the same, I have shown the main evener bar indicated by the reference character 16 located rearwardly of the gathering arms 14 and in the illustration rearwardly of the main frame 10. This location is such as to put the evener bar entirely out of the way of the standing rows of corn.

For the arrangement, which I have in mind wherein three draft horses are employed, it will be understood that the evener bar is supported on a bracket or the like 17 at 18, so that two-thirds of the length of the evener bar is on one side of its pivot point and one-third on the other side.

Secured to the shorter end of the evener bar is a forwardly extending rod or the like 19, which is secured at its forward end to the doubletree 20. Connected with the doubletree 20 are swingletrees 21.

Secured on the long end of the evener bar 16 is a rod or the like 22 extending forwardly and connected at its forward end for the third horse. Thus the third horse walks between the two uncut rows of corn, while the other two horses walk through the rows which have been cut.

That is to say, the row of corn, which is to be cut and to be drawn between the gathering arms 14 is between the third horse and the team. This arrangement, as thus shown, is such as to practically do away with all side draft on all draft animals, as will be readily seen from the drawings.

On the other hand, this arrangement is such that the evener bar is not interfered with by the standing corn, nor does it interfere with such corn. The arrangement here shown, however, involves the problem of how to drive the third horse.

Any extending of the lines across from the seat 13 to the third horse or from the team to the third horse would be unsatisfactory, because such lines would be interfered with by the standing corn. I have therefore mounted on the main frame of the machine, a curved hollow pipe 24, which extends from in front of the driver's seat with gradual curves across the machine and then forwardly in the rear of the third horse. It will be understood that the lines for driving the third horse are extended through this pipe 24, and are thus held without interference in such position extending across the machine that the corn is cut before it reaches the pipe 24. The lines or reins 25 are shown in the pipe 24 by which the third horse is driven.

It will be readily understood from the foregoing illustration, that I have not attempted to illustrate the particular details of the harvesting machine, because such details are not necessary for illustrating the purpose and construction of my invention.

It will also be understood that it is not my purpose to limit myself to the construction shown herein, and that I realize that changes may be made in the construction and details of the parts of my device within the range of my real invention, and it is my intention to cover by my claims any modified structures or use of mechanical equivalents, which may be reasonably included within their scope.

I claim as my invention:

The combination of a harvesting machine having a frame, traction wheels, a tongue, gathering members located between and forward with relation to said wheels, a seat, with a draft device comprising an evener bar pivotally connected between its ends, rearwardly of said gathering members, draft members extending forwardly from said evener bar on opposite sides of its pivot, said seat being located near one side of the machine, and a tubular guide member supported on the machine and extending across the machine from a point adjacent to the seat to a point beyond the gathering members and rearwardly from the forward part thereof, whereby one draft animal may be driven between rows of standing corn, and yet the evener bar will not be interfered with by said corn, nor will it interfere with said corn, and whereby lines may be placed in said tubular guide members, where they will not be interfered with by the standing corn or the like.

Des Moines, Iowa, October 21, 1919.

MORRIS O. HENDERSON.